Oct. 4, 1949.    G. T. LAMPTON ET AL    2,483,912
AUTOMATIC PROPELLER
Filed March 3, 1945
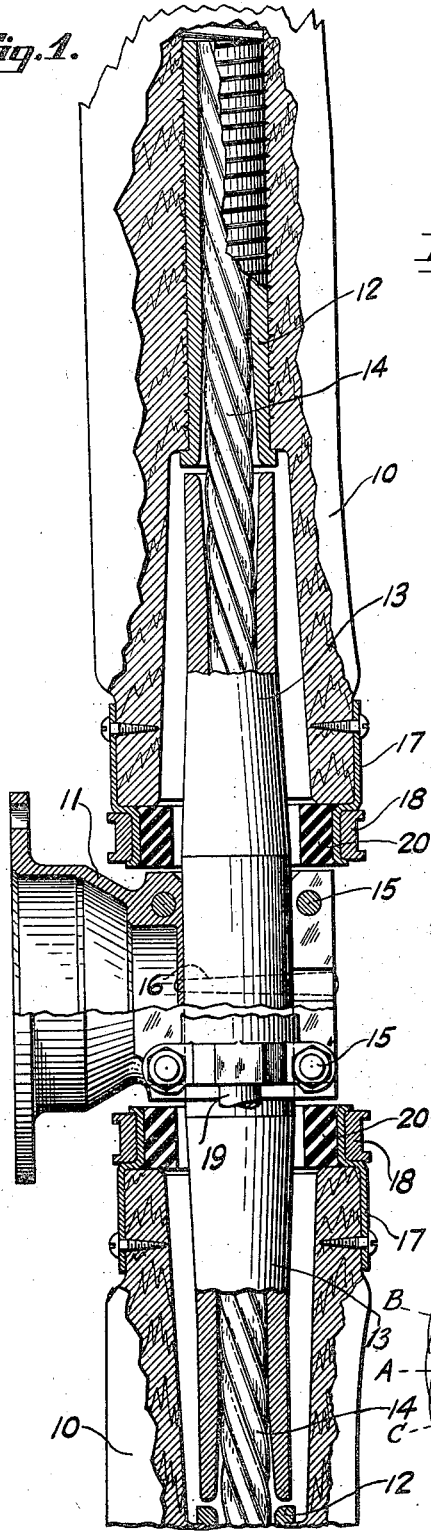
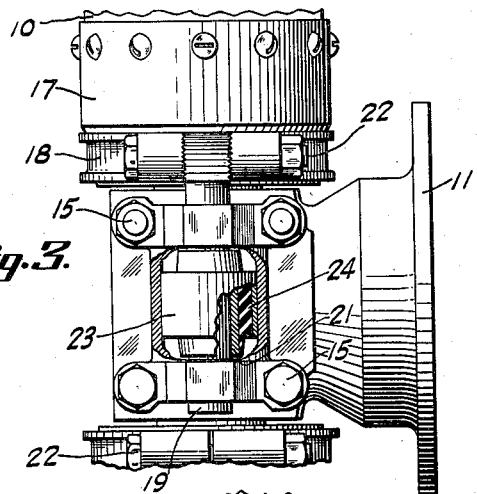
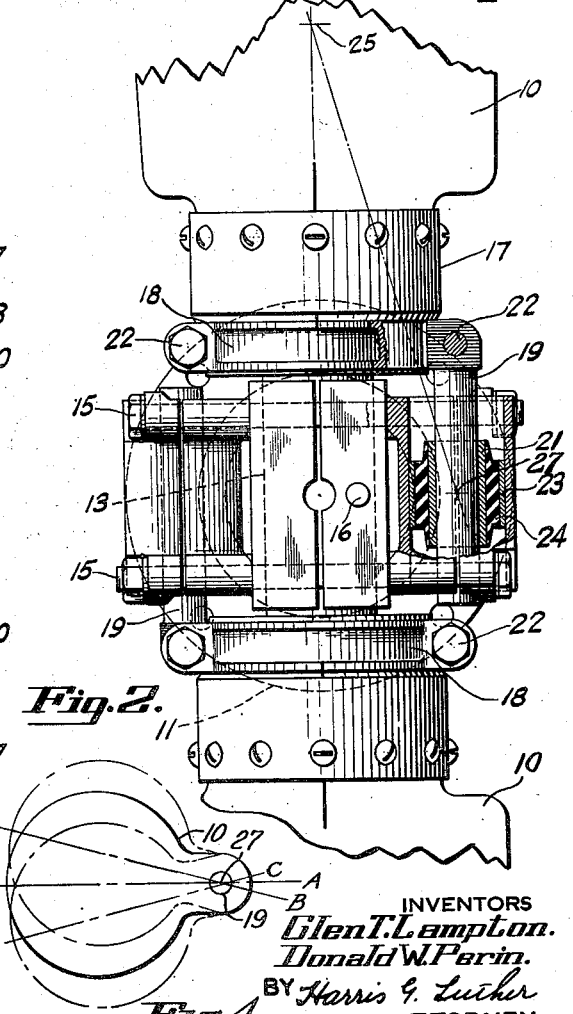
INVENTORS
Glen T. Lampton.
Donald W. Perin.
BY Harris G. Luther
ATTORNEY Patented Oct. 4, 1949

2,483,912

UNITED STATES PATENT OFFICE 2,483,912

AUTOMATIC PROPELLER

Glen T. Lampton, West Hartford, and Donald W. Perin, East Hartford, Conn., assignors to United Aircraft Corporation, East Hartford, Conn., a corporation of Delaware Application March 3, 1945, Serial No. 580,834

9 Claims. (Cl. 170—160.52)

This invention relates to propellers and particularly to a form of aircraft propeller that will have its pitch automatically reduced as its thrust increases, and vice versa, so that the propeller will be self-regulating and maintain substantially constant engine speed over a predetermined airplane velocity range. The specific support for the blades shown in this application is claimed in an application Serial No. 580,835, filed by Glen T. Lampton concurrently herewith.

An object of this invention is to provide an automatic propeller blade pitch changing mechanism which will automatically position the blades at their lowest pitch position during rotation while the plane is standing still and automatically move the blades to an increased pitch position as the velocity of the plane increases and the thrust on the propeller blades correspondingly decreases.

Another object of this invention is a propeller having its blades flexibly attached to the driving hub for limited deflection up-stream by propeller thrust and having tow points in the driving hub, at points eccentric to the longitudinal axis of each blade and substantially within the plane of rotations of the blades so that the deflection upstream will simultaneously twist each blade about its longitudinal axis to change its pitch.

A primary object of the present invention is to provide a self-regulating aircraft propeller, the pitch of whose blades will be varied dependent upon the thrust on the blades, which is a function of the velocity of the plane, while the propeller is rotated at constant speed.

Another object of the invention is to provide a propeller-engine combination that will turn at a take-off rating with zero velocity of the plane and at rated speed in level flight at full throttle and in which the propeller will act during normal flight substantially as a fixed pitch propeller with various engine powers.

Another object of the invention is to attach the blades to their driving hub at a point adjacent the trailing edge of the skirt of the blade substantially within its plane of rotation and eccentric to its axis.

Other objects and advantages will be apparent from the specification and claims and from the drawing which illustrates what is now considered to be a preferred embodiment of the invention.

In the drawing:

Fig. 1 is a fragmentary sectional view taken on a plane normal to the axis of rotation of a propeller made in accordance with the present invention.

Fig. 2 is a fragmentary view of the propeller partly in section and taken on a plane at right angles to the view shown in Fig. 1, and Fig. 3 is a view of the principal parts shown in Figs. 1 and 2 taken on a plane at right angles to the plane of Fig. 2.

Fig. 4 is a schematic view showing how the blade pitch changes with tilting movement of the blade.

Briefly and in its broadest aspect the invention may include the following principal parts: first, a propeller hub; second, blades radially extending therefrom; third, a central cable extending diametrically through said hub and having its ends attached within said blades; fourth, bell-mouthed ferrules secured axially within the blades and to which said cable is attached; and fifth, a point of attachment for said blades to said hub adjacent the trailing edge of the blade and substantially in its plane of rotation.

Referring more in detail to the figures of the drawing, there is shown a two-bladed propeller made in accordance with the present invention.

The blades 10 shown in the drawing are of conventional wooden construction and extend radially from their central driving hub 11. The blades 10 each have an elongated metal ferrule 12 extending centrally and axially therein from their hub ends. At the hub end of the ferrule 12, the opening extending therethrough is bell-mouthed as shown in Fig. 1. Preferably, and as shown in the drawing, the ferrule 12 is threadedly connected to its blade, the threads being so formed that they will have maximum gripping force within the material of which the blade is formed and the shear strength of the threads and of the threaded portion of the blade will be approximately equal.

The driving hub 11 for the blades 10 is provided with a sleeve 13 extending therethrough which, in the two-bladed form of propeller shown in the drawing, may extend diametrically through the center of rotation of the hub. Extending through this sleeve 13 in the hub 11 and into the ferrules 12 secured within the blades 10 is a central bundle of strands 14, these strands preferably being formed of wire and twisted into a cable as shown. The outer ends of the cable, or strands of wire 14, preferably may be secured within the ferrules 12 by soldering, tinning, brazing, or otherwise, the strands being secured to the portion of the opening in the ferrule 12 which is of uniform diameter.

By making use of a central helically wound bundle of wires, a cable having great torsional flexibility is provided so that variations in blade pitch angles is obtained with minimum resistance.

For a purpose presently to be referred to, the cable 14 preferably may be wound with a helix of the opposite hand relative to the rotation of the blade; that is, for a propeller having right hand rotation, the cable would be wound with a left hand helix.

The sleeve 13 through which the cable 14 passes is secured to the hub 11 by clamping it thereto by means of a number of bolts 15. In addition, there may be a transverse shear pin 16 provided extending through the hub 11 and sleeve 13 by means of which the sleeve is locked in position relative to the hub.

The shear pin is installed after horizontal balance of the propeller is obtained by shifting the entire blade assembly. It is apparent that if one blade is thrown from the propeller due to failure of the threads in the blade or by fatigue failure of the cable, the unbalanced centrifugal load will shear the pin 16 and pull the remainder of the blade assembly through the hub so that both blades will leave the hub substantially simultaneously. This will instantly remove the unbalanced condition before serious damage can be done to the engine or its mountings and leave the plane in condition so that the pilot may make a normal dead-stick landing.

By placing the pin 16 at one side of the sleeve 13 as shown in Fig. 2, it does not pass through the opening for the cable 14. As shown in Fig. 2, the hub 11 is split centrally and its opposite side portions are drawn together into frictional contact with the outer surface of the sleeve 13 by means of the bolts 15.

The centrifugal forces acting on the blades 11 serve to stretch and thus slightly unwind the cable 14. Normally there is a pitch reducing moment in the propeller blades 10 due to the centrifugal force which, in the present instance, is balanced by forces in shear acting within the cable 14 and by a reaction on the ball seat attachment of the blades to the hub, or the tow point, presently to be described. By using a left hand cable for a right hand rotation propeller, this reaction is used to advantage for reducing the load on the point of attachment of the blades for the reason that the unwinding of the cable 14 tends to increase the propeller blade pitch.

By reason of the cable 14 extending through the sleeve 13 in the hub 11, and the outer ends of the opening within the sleeve 13 being bell-mouthed and extending through the bell-mouthed ferrules in the blades, the blades 10 may articulate or flex within limited angles relative to their driving hub 11 in any direction. The cable 14, made up of numerous strands and located centrally and extending longitudinally of the blades 10, permits this angular adjustment of the blades to vary their pitch with but slight torsional resistance.

To retain the blades 10 in their position, while permitting limited pitch changing movements and angular movement in their plane of rotation and in the direction of flight, the skirts of the blades 10 have sleeves 17 surrounding them. The sleeves 17 preferably are of sheet material and enclose thick collars 20 of resilient material such as rubber. Surrounding each of the sleeves 17 is a two-part clamping member 18 having a radially inwardly extending post 19 adjacent the trailing edge of the blade 10 and at a point eccentric to the blade axis. This post 19 at one end engages within portions of the clamp 18 and is held firmly therebetween. At its inner or free end the post 19 is slidable and rotatable within an opening in a resiliently mounted sleeve 21 housed within a portion of the hub 11.

The resilient collars 20 within the sleeves 17 are spaced from and surround the outside surface of the sleeve 13 so that the blade 10 is free to bend or tilt a limited distance in any direction. The collars 20 act as resilient stops so that tilting movements beyond a limited amount will be prevented by engagement of the collars with the sleeve 13.

The collars 18 are preferably formed in two semi-circular parts and between the ends of these members on one side may be securely clamped the fixed end of post 19. For this purpose and to hold the opposite ends of the collar members 18 together bolts 22 may be provided.

As shown most clearly in Fig. 3 the sleeve 21 which may be of metal is mounted centrally within an outer sleeve 23 fitting an opening within the hub 11. Disposed between sleeves 21 and 23 is an annular space, partially filled with resilient material 24 preferably of semi-vulcanized rubber suitably bonded to the surfaces of the sleeves. The post 19 at a point within the sleeve 21 forms a point of attachment or tow point for the blade 10 to which the post 19 is attached. This point, it will be seen, forms in effect a ball seat and is eccentric to the center of rotation of the propeller and substantially within its plane of rotation and is substantially fixed with respect to the hub.

The blades 10 mounted in this manner may deflect about this point of attachment of posts 19 in the direction of flight or forwardly causing the skirt of the blade to move slightly downstream and thus vary its pitch.

In the construction just described the tow point 27 is the central point within a rubber bushing clamped into a split tubular member bolted to the side of the hub. The resilient characteristic of the bushing is so selected that the natural frequency of the angular motion of the blade with respect to the crankshaft in the plane of rotation is less than the explosion frequency of the engine at idling speed. Some adjustment of the rate of change of pitch is obtainable with these bushings by installing them at different locations in the tubular clamp. It is apparent that this changes the distance to the hinged point 25 and therefore the angular sensitivity to motion of the blade skirt.

The pivotal or hinge point at which a blade 10 deflects is at or near the joint formed by the bell-mouth ends of the openings in the sleeve 13 and the ferrule 12. This point, as indicated at 25, is at an intermediate portion of the blade 10 and at a substantial radial distance from its center of rotation. Preferably this hinge point 25 about which the blade may articulate is at about 12% to 15% of the blade radius. This flexing or articulating movement of the blade 10 about point 25 takes place while the trailing edge of the blade is held against movement, by the post 19 within the sleeve 21. This movement of the blade, therefore, results in the pitch angle of the blade being changed. The greater the deflection of the blade about point 25 while the trailing edge of the blade is held in fixed position by post 19 and the sleeve 21 due to greater thrusts, the more the angular position of the blade will be changed in a direction to reduce its pitch.

As the blade moves forward about point 25 as a result of increased thrust or reduced centrifugal force the inboard end or shank of the blade will move rearwardly, this rearward motion will take the form of an arc about fixed point 27. As is evident from the schematic sketch, Fig. 4, such movement will cause a change in blade pitch. In other words, movement about point 27 will cause a line parallel to the blade chord to move from A—A to either B—B or C—C and thus change the blade pitch accordingly.

As the cable 14 is wound with a left hand helix and the blade 10 has a right hand rotation and the centrifugal forces acting on the blade tend to unwind the cable slightly, the pressure acting on the post 19 forming the fixed point of attachment of the blade is reduced as the thrust is increased.

For a given propeller design, the upstream deflection of the blade may be computed with a reasonable degree of precision, and thereafter the location of the tow point can be determined so that the change in pitch under difference in thrust is such an amount that substantially constant engine speed can be maintained throughout the entire velocity range of the airplane at one throttle setting.

Furthermore, if the airplane exceeds its design velocity in a dive, the propeller will automatically increase its pitch beyond its normal level flight value and will maintain constant propeller speed under this regime.

At reasonably constant values of $V/nD$, (where $V$ equals velocity of the plane, $n$ equals R. P. M. of propeller and $D$ equals diameter of propeller) which exist during part throttle level flight of an aircraft, the thrust, torque and centrifugal loads all vary as the square of the engine speed. Since these forces are designed to be in equilibrium, it follows that the propeller will change pitch only in response to a change in attitude, and consequent change in forward velocity of the aircraft, and that the pitch will be independent of throttle position in level flight. The propeller, therefore, behaves substantially as a fixed pitch propeller under engine throttle changes in level flight.

If so desired, the design factors can be predetermined and the tow points positioned so that the propeller-engine combination, instead of maintaining constant speed under all conditions of flight at a single throttle setting, will provide a high speed for take-off and a lower speed in level flight. With the propeller so adjusted and the throttle maintained at full throttle position the propeller speed will slow down as the airplane gathers forward velocity during and after take-off, thus providing a propeller which will automatically give the increased power desired for take-off.

It is to be understood that the invention is not limited to the specific embodiment herein illustrated and described, but may be used in other ways without departure from the spirit of the invention as defined by the following claims.

We claim:

1. A self-regulating propeller comprising in combination, a driving hub, and a plurality of blades flexibly supported therefrom, said blades being freely articulated about an intermediate point in their lengths and movable about said point in response to variations in thrust and having an attachment to said hub at a point located substantially in the plane of rotation longitudinally spaced from said intermediate point and eccentric to the blade centerline, whereby said blades will vary their pitch with variations in thrust.

2. A self-regulating propeller comprising in combination, a driving hub, and a plurality of blades flexibly supported therefrom, said blades being freely articulated for limited movement in any direction about an intermediate point of said blades and having an attachment to said hub at a point located substantially in the plane of rotation and eccentric to the centerline of said blade and adapted to increase its pitch with increasing velocity and decreasing thrust in response to deflections of the blade transverse to the plane of rotation about said point in the plane of rotation and about the intermediate point of said blade about which said blade may deflect.

3. A self-regulating propeller comprising in combination, a driving hub, a plurality of blades flexibly supported therefrom, said blades being freely articulated for limited pivotal movement in any direction about an intermediate point of their length and having an attachment to said hub at points located substantially in the plane of rotation and eccentric to the centerline of said blades, whereby said blades increase their pitch with increasing forward velocity of said propeller in response to decreasing thrust and the resulting deflections of the blade transverse to the plane of rotation about said fixed point and about the intermediate point of said blade about which said blade may deflect.

4. In combination, a hollow propeller blade, a hub, a blade supporting joint intermediate the ends of and within said hollow blade providing for universal movement of said blade about said joint, means for restraining a selected portion of said blade, spaced chordwise and lengthwise of said blade from said joint, against movement relative to said hub whereby movement of said blades about said portion and about said blade supporting joint will cause a change of blade pitch.

5. In combination, a propeller blade, a hub, a blade support, located substantially on the longitudinal axis of the blade, spaced toward the tip from the shank end of said blade, and providing for universal movement of said blade about said support, means for restraining a portion of said blade adjacent the trailing edge and shank end of said blade against movement relative to said hub whereby movement of said blade about said portio? ⁊d about said blade support under the action    thrust forces will cause a change in blade pitch.

6. An aircraft propeller comprising in combination, a central driving hub, blades extending radially therefrom, a flexible connection for each blade restraining said blades against outward movement, and means connecting each flexible connection with the hub, said connection being flexible laterally of the blade at a portion of the connection spaced from the axis of rotation of said propeller, a second point of attachment connecting each blade with the hub, said point located on the trailing edge side of said blade substantially in the plane of rotation of said propeller, eccentric to the centerline of each blade and inward of said portion whereby an increase in thrust will move the shank of said blade rearwardly about said point and decrease the propeller pitch.

7. A self-regulating aeronautical propeller for an airplane for maintaining substantially constant propeller rotative speed for a constant throttle setting and different airplane forward speeds comprising, a central hub, a plurality of blades outstanding therefrom, a flexible connection for each blade secured to said blade and restraining said blade against outward movement under the influence of centrifugal force, means connecting each flexible connection with the hub, said connection being flexible at a portion of the connection spaced from the axis of rotation of said propeller and located within the blade and intermediate the ends of said blade whereby the blade may tilt laterally of its longitudinal axis, means connecting the hub and blades for restraining a selected portion of said blade, spaced chordwise from the flexible portion of said connection on the trailing edge side of said blade and inward of said flexible portion, against movement relative to said hub whereby an increase in propeller thrust or a decrease in propeller rotative speed incident to a decrease in forward airplane speed will move the shank of the blade, except said selected portion, rearwardly about said flexible portion of said connection and decrease the propeller pitch to restore or maintain the propeller rotative speed.

8. A self regulating propeller, comprising in combination, a driving hub, and a plurality of blades flexibly supported therefrom, said blades being freely articulated about an intermediate point in their lengths and moveable about said points in response to variation in thrust and having an attachment to said hub at a point located substantially in the plane of rotation, radially inward of said intermediate point, and adjacent the trailing edges of said blades, eccentric to the blade centerline, whereby said blades will increase their pitch with decrease in thrust incident to increases in forward velocity of said propeller.

9. A self-regulating propeller comprising in combination, a driving hub, a plurality of blades, means for supporting the blades consisting of a flexible support flexibly centrally and internally supporting said blades from said hub, said support being flexible laterally of the longitudinal axis of said blade to provide limited angular movement of the blades in the plane of rotation and in the direction of flight, means connecting the hub and blades for restraining said blades against lateral movement at a point on the blades in the plane of rotation and at the trailing edge of said blade.

GLEN T. LAMPTON.
DONALD W. PERIN.

REFERENCES CITED

The following references are of record in the file of this patent:

UNITED STATES PATENTS

| Number | Name | Date |
| --- | --- | --- |
| 1,919,586 | Dodge | July 25, 1933 |
| 1,952,812 | Mansson | Mar. 27, 1934 |
| 2,112,797 | Tyler | Mar. 29, 1938 |
| 2,146,367 | Berliner | Feb. 7, 1939 |
| 2,234,196 | Prewitt | Mar. 11, 1941 |

FOREIGN PATENTS

| Number | Country | Date |
| --- | --- | --- |
| 449,664 | Great Britain | July 1, 1936 |
| 563,529 | France | Dec. 7, 1923 |
| 568,951 | France | Jan. 2, 1924 |